June 24, 1924.

J. HASSELBRING, JR 1,498,840

VARIABLE SPEED TRANSMISSION MECHANISM

Filed July 2, 1920   3 Sheets-Sheet 3

Patented June 24, 1924.

1,498,840

UNITED STATES PATENT OFFICE.

JOHN HASSELBRING, JR., OF FARMINGDALE, NEW YORK.

VARIABLE-SPEED TRANSMISSION MECHANISM.

Application filed July 2, 1920. Serial No. 393,655.

*To all whom it may concern:*

Be it known that I, JOHN HASSELBRING, Jr., a citizen of the United States, residing at Farmingdale, in the county of Nassau and State of New York, have invented certain new and useful Improvements in Variable-Speed Transmission Mechanisms, of which the following is a specification, reference being had therein to the accompanying drawings, which form a part thereof.

My invention relates to variable speed transmission mechanisms, and more particularly to a type thereof wherein power from the driving shaft is transmitted to the driven shaft through a mechanism which is purely mechanical in its nature as distinguished from electrical, said mechanism requiring no shifting of gears to effect a change from one speed to another.

In a transmission mechanism made in accordance with my invention, I am not only enabled to secure a variance of speed in the driven shaft without the shifting of gears, but the transmission mechanism is so actuated automatically as to secure a variance in the operative effect of the driving shaft upon the driven shaft as determined by the load conditions upon the latter, or as determined by the speed of the driven shaft.

The power used in effecting a change in the relation of parts to vary the speed at which the transmission mechanism is operative upon the driven shaft, is derived from the driving shaft, and applied through a controlling machanism which is mechanical throughout, thus ensuring a positive action of the transmission mechanism in going from one speed to another. This controlling mechanism is set by means of a mechanism, the operative effect of which is determined by a centrifugal governor driven from the driven shaft. This mechanism preferably includes electro-magnets operative upon the controlling mechanism only, an arrangement which has proven satisfactory in use, since the electric current is used merely to effect the setting of the controlling mechanism, and is not instrumental in any way in transmitting power from the driving to the driven shaft. Because of this condition, the transmission mechanism cannot be made inoperative, nor can the effective transmission of power from the driving to the driven shaft be modified as a consequence of the disturbance of electrical conditions about the transmission mechanism, the complete interruption of the circuit not affecting in any way the transmission of power, but merely preventing the automatic variance in the operative effect of this mechanism with a change of speed in the driven shaft due to varying load conditions.

The transmission mechanism of my invention is particularly adapted for use in automobiles, its construction being such that the effective torque from the engine power will be proportioned to the load upon the engine, thus permitting the R. P. M. of the engine to be such as to secure the highest efficiency, the automatic variation of the operative effect of the speed transmission mechanism having the effect of preventing the stalling of the engine with an increase of load upon the driven shaft, when set at high speed, or the racing of the engine with the diminution of this load, when set at low speed.

While in the form of the invention shown but two speeds in the direct drive are provided for, great flexibility of power in the engine is secured, since the transmission mechanism operates at one speed or the other, as determined by the load conditions, and there can be no sudden change from speed to speed, the variance in the set of the transmission mechanism being effected only when the speed of the vehicle has attained the maximum speed provided for by the setting of the transmission for low speed, or the minimum speed provided for by the setting of the mechanism for high speed.

My invention contemplates a structure wherein the maintenance of a constant low speed or a high speed below the maximum efficiency of the engine, is secured through the actuation of the carbureter throttle valve, or the control of the engine efficiency in a manner to prevent the automatic actuation of the transmission mechanism.

The transmission mechanism is preferably so constructed that it may be brought to, and set in, a neutral position where no power will be transmitted from the driving shaft to the driven shaft, or to a position of reverse, wherein power may be transmitted from the driving shaft to the driven shaft in a manner to reverse the direction of drive of the latter.

The functioning of the transmitter, aside from the mechanism for preventing transmission of power and for reversing the direction of drive of the driven shaft, is entirely automatic in its functionings, the latter mechanism being of necessity manually and selectively operative.

The actuating means for the controlling mechanism effects the automatic variation in the speed of the driven shaft under the control of the driving shaft, and is so constructed and arranged that the magnets thereof will be energized only momentarily when conditions are such as to require the actuation of the controlling mechanism.

In changing from one speed to another there is no clashing of gears, and the construction and arrangement of the various parts is such that little or no power is lost as a result of friction between different co-acting parts of the mechanism.

When the mechanism is set for the transmission of power, there is a direct coupling between the driving shaft and the driven shaft, the conditions of which remain unchanged irrespective of the speed at which the latter shaft is driven. To secure the desired result, I provide a driving shaft having two sections, one of which is driven at a constant speed by the engine, means being provided whereby these two sections may be set for high speed through a direct coupling therebetween, or at low speed through a gear train, the gears of which are in constant mesh, said direct coupling and said gear train being so constructed when the device is functioning, that one becomes inoperative as the other becomes operative. In this manner, coupled with the use of an actuating means for the control of said coupling and said gearing the operative effect of which is governed by the speed of the driven shaft, power cannot be applied for a high speed drive unless the speed conditions of the driven shaft are such as to permit same without overloading the engine.

The invention consists in the novel features of construction and combination of parts hereinafter set forth and described, and more particularly pointed out in the claims hereto appended.

Referring to the drawings.

Like letters refer to like parts throughout the several views.

Figure 1:
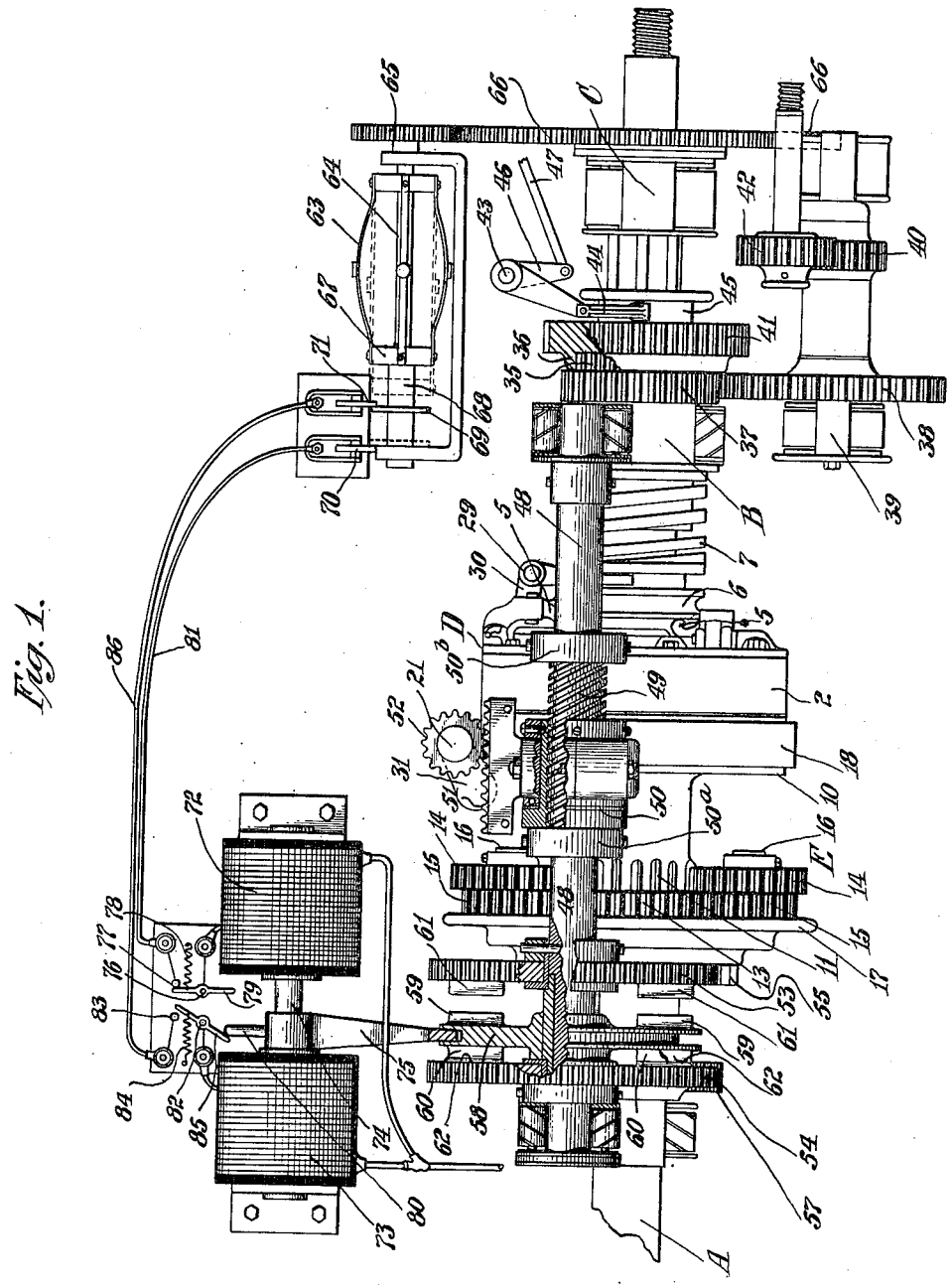
Fig. 1 is a side view of a variable speed transmission mechanism made in accordance with my invention, portions thereof being broken away.

In the embodiment of my invention shown in the drawings, the driving shaft consists of two sections A and B, the former of which is adapted to be connected through the medium of the usual foot clutch with an internal combustion engine, and the latter of which, B, is adapted to be connected through a coupling member with the driven shaft C.

In the drawings I have not shown the housing for the mechanism, it being understood that the various roller bearings illustrated are adapted for use with suitable bearing housings carried by a suitable casing.

The two sections A—B of the driving shaft are operatively connected through the medium of a friction clutch D when the transmission is set for high speed, or a gear train indicated at E when the mechanism is set for low speed, a controlling mechanism being provided for the purpose of synchronizing the functionings of said clutch and said gear train, and causing one of them to become inoperative as the other becomes operative.

Referring more particularly to the direct friction clutch connection between the sections A and B, this mechanism is shown as consisting of a drum 1, keyed or otherwise secured to the shaft section A, co-operating with a clutch housing 2 idly mounted upon the shaft section A and keyed or otherwise secured to the section B. Between the drum 1 and the housing 2 are the usual friction disks 3 acted upon by the ring 4 through the medium of a plurality of levers 5, one end of each of which is pivotally connected to said housing, and the other end being acted upon by a grooved collar 6, slidably mounted upon the portion of said casing keyed to the shaft B. The spring 7 has a normal tendency to set said clutch mechanism.

The housing 2 is mounted upon a suitable anti-friction bushing 8, having a flange 9 positioned between the said housing and the drum 1.

The above described friction clutch mechanism constitutes a direct coupling, or affords a means of a direct connection, between the shaft sections A and B for a high speed drive.

Idly mounted upon the hub of the housing 2 is a band brake drum 10, the hub of which carries a suitable spur gear 11. A flanged anti-friction bushing 12 forms a bearing between said drum and its hub and the end of the housing 2 and its hub respectively.

Said drum 10 forms a part of the controlling mechanism by means of which the low speed connection between the shaft sections A and B is made operative or inoperative as conditions demand, no power being transmitted through said drum.

The low speed mechanism comprises a gear 13 keyed or otherwise secured to the hub of the housing 2 adjacent the gear 11 and a plurality of pairs of connected gears 14—15, each pair being idly mounted upon a bearing stud 16 upon a flange or plate 17 carried by and rotatable with the shaft section A. The gear 14 meshes with the gear 11 and the gear 15 meshes with the gear 13. The ratio of the diameter of the gears 11, 13, 14 and 15 may be varied according to the desired reduction in the speed secured when these gears are operative to transmit power, or when the transmission is set for a low speed. In the form of the invention shown, the diameter of the gear 11 is relatively larger than the gear 14 meshing therewith, while relatively smaller than the gear 13, and the diameter of the gear 15 is relatively smaller than that of its associated gear 14.

Co-operating with the brake drum 10 is means whereby said drum may be permitted to turn freely, or may be held against rotation, to cause power to be transmitted independently of, or through said gears, as determined by other elements in the controlling mechanism, and the actuating means therefor. In the form of the invention shown, this means includes therein a band 18, the end lugs 19 and 20 of which receive a reciprocatory shaft 21 having a collar 22 thereon adapted to engage one of said lugs 19, the other of said lugs engaging a stop 23 supported by a bushing 24 upon the shaft 21, said stop being adjustable axially of the shaft and in relation to said bushing, to permit the setting of the band in assembling the transmission, or its resetting to compensate for wear, so as to develop the desired braking action.

Positioned between the lugs 19 and 20 is a spring 25 having a constant tendency to separate the said lugs and relieve the drum 10 from effective braking pressure from the band. The band 18 is made of metal having a suitable friction lining.

Carried by one end bearing 26 for the shaft 21 is a cam 27 adapted to co-operate with an opposed cam 28 carried by said shaft to impart reciprocatory movement to said shaft as a result of its rotary movement, which latter movement is relied upon to release the clutch mechanism D, or permit it to set under the spring 7, and to synchronize the functioning of said clutch mechanism D with that of the band brake mechanism.

To secure the desired co-ordination between said clutch mechanism D and said band brake, I provide means whereby the former will be released simultaneously with the setting of the latter, and vice versa.

The above results are secured by means of a rock shaft 29 mounted adjacent the collar 6 and operatively connected with the shaft 21 by means of a lever arm 30 carried by the shaft 29 and a cam 31 carried by the shaft 21 and operative upon said arm.

This shaft carries oppositely disposed arms 32 and 33, having pivoted therebetween a yoke 34, the arms of which are adapted to enter the groove in the slidable collar 6.

Carried by and rotatable with the shaft section B is a toothed clutch member 35 adapted to be engaged by a co-operating clutch member 36, splined or otherwise slidably mounted upon the driven shaft C. One end of said shaft C is rotatably mounted in the end of the shaft section B, the shaft sections A, B and C being axially alined and so mounted in relation to each other and the associated parts, as to avoid any possible loss of alinement of the three sections.

In addition to connecting the shaft sections B and C by means of the coupling members 35 and 36, I utilize said clutch member 36 as a means for preventing transmission of power from the driving to the driven shaft, and for reversing the direction of drive of the latter. To secure this result, I mount upon the shaft section B, adjacent the clutch member 35, a spur gear 37 rotatable with the section B and constantly in mesh with a gear 38 carried by a countershaft 39. Said countershaft also carries a spur gear 40 adapted to be connected with a spur gear 41 upon the sliding clutch member 36 through the medium of an intermediate idler gear 42. In this manner movement of the sliding clutch member 36 in one direction, to the left of Fig. 2, will couple the driving shaft A—B directly with the driven shaft C, irrespective of the speed of drive, or said clutch member may be utilized by moving it in the other direction, or to the right of Fig. 2, into mesh with the idler gear 42, so as to drive the shaft C through the medium of the gear train 37, 38, 40, 41 and 42 in a reverse direction. While the ratio of the different gears of this train will secure a reduction of speed in the reverse drive, it will be observed that the speed of this drive will be determined by the normal action of the power transmission elements in the mechanism.

Figure 2:
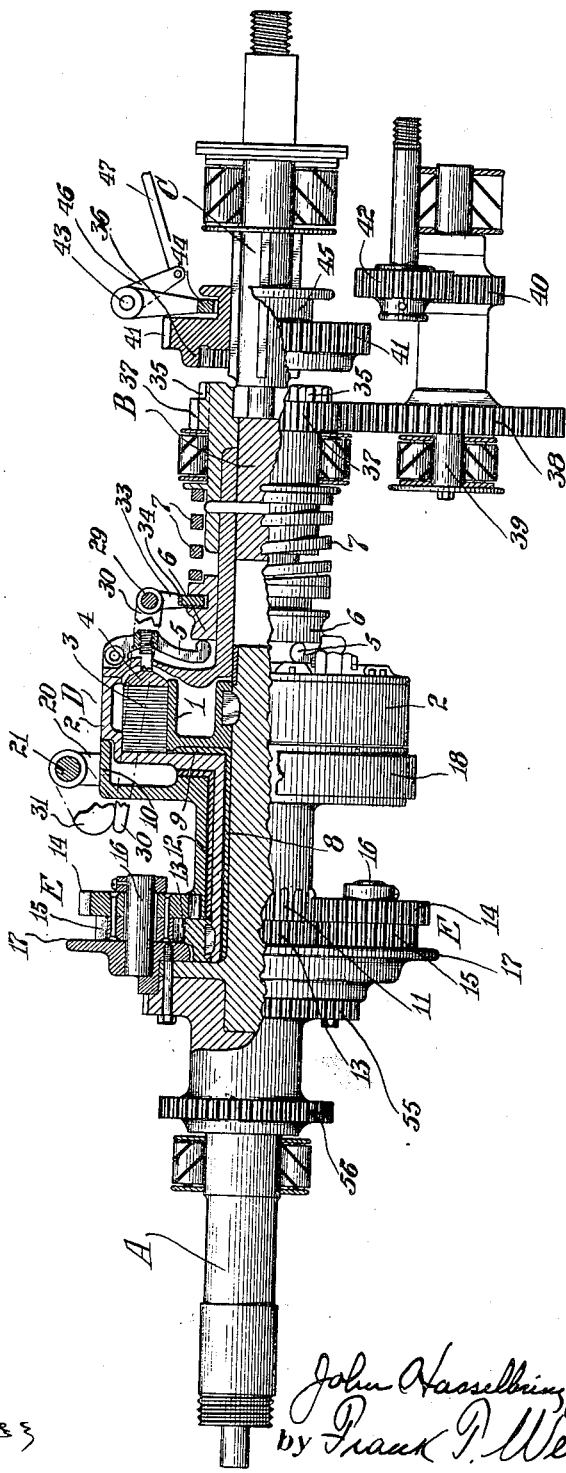
Fig. 2 is a similar view with the controlling mechanism and the actuating means therefor removed, a portion of the mechanism being shown in vertical section.

Mounted adjacent the slidable clutch member 36 is a crank shaft 43 carrying a forked member 44 engaging a grooved hub or collar 45 upon said clutch member. Said shaft 43 carries a crank arm 46 connected with a suitable control device adjacent the controllers for the engine, by a connecting rod 47. In this manner the coupling 36 may be brought into engagement with the coupling member 35 as shown in Fig. 1, to rotate the shaft C in the same direction as the shaft A—B, or it may be disengaged therefrom as shown in Fig. 2; to disconnect said shaft C from the shaft A—B to prevent transmission of power to the driven shaft, or it may be moved still further to the right (Fig. 2) so as to mesh the gear 41 with the gear 42 to impart a reverse drive to the shaft C.

The controlling mechanism, by means of which the relative speed of the driving shaft sections A and B is determined, comprises, in addition to the shafts 21 and the parts thereon and actuated thereby, a countershaft 48 extending adjacent said sections and having a screw-threaded portion 49. Mounted upon said screw thread is a traveler block 50 having rotatably mounted thereon by means of a suitable bearing and stirrup, a rack 51 in mesh with the gear 52 upon the shaft 21. The block 50 has interior screw threads cooperating with the screw-threaded portion 49 of the shaft 48. By this construction the shaft 21 may be rocked to the right or left, according to the direction of travel of the rack 51 under the control of the shaft 48, the direction of rotation of which shaft is determined by the actuating means for the controller mechanism and gearing connecting the shaft 48 with the driving shaft section A through the medium of a clutch controlled by said actuating mechanism.

This means of causing the actuation of the controlling mechanism so as to cause the shaft sections A and B to be rotated at the same speed, or the section B to be rotated at a relatively lower speed than the section A, comprises, in the form of the invention shown, two gears 53 and 54 idly mounted upon the shaft 48 and adapted to be connected therewith by means ensuring the disconnection of one of said gears from said shaft when the other is connected therewith.

The gear 53 is in constant mesh with a gear 55 carried by the shaft section A, while the gear 54 is entrained with a gear 56 carried by said section A, through an idler gear 57. In this manner the gear 53 is constantly rotated in one direction while the shaft A is turning, the gear 54 being constantly rotated in the opposite direction.

The gears 53, 54, 55 and 56 are spaced apart for the purpose of affording clearance between the former, for a clutch wheel 58 splined or otherwise slidably mounted upon the shaft 48, and having upon the opposite faces thereof, clutch teeth 59 and 60, the former of which is adapted to engage co-operating clutch teeth 61 upon the gear wheel 53 and the latter of which is adapted to engage co-operating clutch teeth 62 upon the gear wheel 54.

The gear 53 is operative to set the transmission mechanism for low speed, while the gear 54 is operative to set it for high speed.

The wheel 58 forms the connection between the controlling mechanism and the actuating mechanism therefor, which latter will now be described.

The purpose of this actuating mechanism is to govern the operative effect of the controlling mechanism so that when the R. P. M. of the driven shaft C is below a certain predetermined speed, the wheel 58 will be so actuated as to cause the controlling mechanism to so set the power transmission mechanism as to cause power to be transmitted from the section A to the section B through the planetary gearing system; but when the R. P. M. of this shaft exceeds this predetermined speed, to cause the controlling mechanism to so set the transmission mechanism as to cause said gearing to become inoperative, and the clutch mechanism connecting the sections A and B to become operative in a manner to cause these shaft sections to turn at the same speed. To secure this result, I employ a centrifugal governor actuated from the driven shaft C, and operative connections between this governor and the wheel 58, whereby said wheel will be shifted upon the shaft 48 so as to connect either gear wheel 53 or 54 with said shaft, according to the speed of the driven shaft C. In the interest of simplicity of construction, the power for operating the actuating mechanism is secured by the use of electromagnets, and a suitable source of electrical supply, the circuit to said magnets being controlled by means of a suitable make and break mechanism controlled by said governor.

In the form of the invention shown, I employ an ordinary spring governor 63, the shaft 64 of which is driven from the driven shaft C by means of gears 65 and 66. The end plate 67 of the governor 63 carries a sleeve 68 on which is mounted a ring contact 69 adapted to engage the contacts 70 or 71, according to the governor speed. The contact 69 is electrically connected with a source of current supply, or with ground, as desired.

Adjacent the wheel 66 are two opposed solenoids 72 and 73 having a common core 74 upon which is secured a fork 75 engaging the groove in the periphery of the wheel 58.

The solenoid 72, which may be termed the "low speed" solenoid, is in circuit with the contact 70, while the solenoid 73, or "high speed" solenoid, is in circuit with the contact 71. Hence when the ring 69 engages the contact 70, the solenoid 72 will be energized, while when said ring engages the contact 71, the solenoid 73 will be energized.

To prevent continuity in the flow of the current beyond that interval required to shift the clutch wheel 58, I provide supplemental circuit interrupters in the connections between said solenoids respectively, and the contacts co-operating with the governor contact controlling the flow of the current thereto, which interrupters or supplemental make and break mechanisms are actuated as a result of the movement of the core 74 substantially simultaneously with the completion of the shifting movement of the wheel 58. The interrupter associated with the solenoid 72 consists of a pivotal member 76 normally held in engagement with the contact stud 77 by the spring 78, the other arm 79 thereof being held by said spring in the path of movement of the stud 80 carried by the yoke 75. The stud 77 is connected electrically with the conductor wire 81 leading from the contact 70, while said pivotal member 76 is electrically connected with the solenoid 72. Mounted adjacent the solenoid 73 is a similar pivotal member 82 co-operating with a similar contact stud 83 and acted upon by a spring 84, one arm 85 of said member 82 being in the path of movement of said stud 80. The stud 83 is electrically connected through the conductor wire 86, with the contact 71, while the pivotal contact member 82 is electrically connected with the solenoid 73.

As will appear more fully hereinafter, the supplemental circuit interrupter mechanism above described, is so constructed that when one of said solenoids has been energized to impart the necessary shifting movement to the clutch wheel 58, the circuit interrupter associated therewith will be actuated to de-energize the solenoid, the circuit interrupter associated with the other solenoid, however, being so actuated as to permit the flow of current thereto upon the closing of the circuit through the governor control contact associated therewith. In this manner the interval during which any magnet is energized is co-extensive with that required to shift the wheel 58 of the controlling mechanism.

With the foregoing mechanism, it is apparent that the transmission mechanism is not dependent upon the electrical conditions in and about same, so far as power transmission is concerned, since a failure of the current will merely have the effect of preventing the automatic variance in the speed at which the driven shaft section B and the driven shaft C coupled directly therewith, is rotated.

The operation of the herein described mechanism is substantially as follows:—

The term "driving shaft" is herein used to include or embrace both shaft sections A and B, since such sections rotate continuously while the engine is in operation. The term "driven shaft" is herein used to designate the shaft section C, which may or may not be driven continuously while the engine is running. Furthermore, the sections A and B are always connected directly or indirectly with the source of power, while the section C is always connected with the point of ultimate utilization of that power, while being capable of connection with, or disconnection from, the source of power.

The term "controlling mechanism" is used herein to designate those parts or mechanisms which are utilized to establish a condition which will vary the functional effect of those parts through which power is transmitted from the engine to the mechanism actuated by the shaft C as distinguished from those mechanisms which are effective to actually transmit such power.

The term "actuating mechanism" is herein used to designate those agencies which vary or determine the operative effect of the controlling mechanism, and have no other function in the mechanism.

When an engine or other source of power is at rest, the clutch members 35 and 36 are disconnected, and the clutch wheel 58 will be positioned with the clutch teeth 59 thereon in engagement with the clutch teeth 61 upon the gear wheel 53. The brake band 18 will be set upon the drum 10 and the shaft 21 will be so positioned as to not only so set said brake mechanism, but to so actuate the shaft 29 and the yoke 34 carried thereby as to hold the collar 6 away from the various lever arms 5, thus releasing the friction clutch mechanism 1—2—3 and holding the drum 10 and the gear 11 carried thereby against rotary movement.

When the engine or other source of power is started, the shaft section A, which is coupled directly therewith as by an ordinary friction clutch, will turn with the same R. P. M. as the engine crank shaft, the drum 1 turning freely therewith without transmitting any power to the clutch casing 2. The plate 17, which is carried by and rotatable with the shaft section A, will impart a planetary movement to the several pairs of gears 14 and 15 carried upon the respective studs 16, which movement of said gears by reason of the engagement of the gear 14 of each pair with the gear 11, (which under this condition is a fixed gear) and the engagement of the gear 15 of each pair with the gear 13, (which is carried by the hub of the clutch housing 2) will impart a rotary movement to said housing 2 but at a reduced speed, owing to the partial revolution of each pair of gears during each full revolution of the shaft section A and its plate 17. This type of planetary gearing is old and well known in the art, so that a more detailed description of its functioning is unnecessary.

The speed ratio under the conditions above referred to, of the shaft section A and the housing 2, will be in direct proportion to the ratio of the several gears of the planetary gear system, so that any desired speed reduction may be secured with an appropriate variation in the ratio of the several gears.

While the clutch housing 2 and its hub are idly mounted in relation to the shaft section A, the cap forming a part of said housing is keyed or otherwise permanently secured to the driving shaft section B, so that with the starting of the engine while the R. P. M. of the section A will coincide with that of the engine crank shaft, the R. P. M. of the shaft section B will be lower, as determined by the construction and arrangement of the planetary gearing.

Hence when starting the engine, the gear transmission mechanism will always be set for low speed, so that it is impossible under any conditions to couple the driven shaft C to the driving shaft section B except when the latter is running at low speed.

When it is desired to apply the power from the engine to the mechanism connected with the shaft C, the slidable clutch member 36 will be moved to the left (Fig. 2) until the clutch teeth thereon engage the clutch teeth of the member 35, this shifting of the clutch member 36 being effected through the fork 44, the rock shaft 43, the crank arm 41 and the connecting rod 47, which latter will be located convenient to the other controls for the engine and the automobile. When thus actuating the coupling member 36, the engine clutch is used in the usual way to facilitate the connection of the clutch surfaces.

When the driving shaft section B and the driven shaft C have been coupled in the manner described, by the operator, power will be applied to the driving wheels of the automobile, and at the same time the centrifugal governor 63 will be actuated.

After the driving shaft section B and the driven shaft C have been thus coupled together, the operator need give no further attention to the transmission mechanism, since thereafter its functioning will be fully automatic, and the torque upon the driven shaft C will be automatically increased with an increase of the load from any source whatever resulting in the slowing down of the vehicle; while the torque will be decreased with a decrease in the load upon said driven shaft and with a resultant increase in the speed of the vehicle. In other words, the transmission mechanism will automatically go to high or to low speed according to the working conditions at the driven shaft.

As the engine gradually picks up the load of the vehicle, and until it reaches the maximum speed when the transmission is set for low speed, the centrifugal governor 63, although constantly rotated, will not have attained sufficient speed to impart an outward tendency to the weighted spring arms thereof, but upon the attainment of this maximum low speed, said arms will move outwardly to an extent sufficient to bring the contact ring 69 into engagement with the fixed contact 71, and thus close the electrical circuit to the solenoid 73, the energizing of which solenoid will move the core 74 to the left and impart a similar movement to the clutch wheel 58 through the medium of the forked arm 75. With this movement of the clutch wheel, the clutch teeth 59 thereon will be disengaged from the clutch teeth 61 upon the gear 53, and the clutch teeth 60 thereon will be engaged with the clutch teeth 62 upon the gear 54, thus disconnecting the gear 53 from the shaft 48 and connecting the gear 54 therewith.

Since the gear 54 is entrained with the gear 56 upon the shaft section A through the intermediate gear 57, this coupling of the shaft 48 to said gear, will turn the shaft 48 clockwise, (from the left of Fig. 1) thus turning the screw 49 in a manner to cause the traveler block 50 to move to the left, carrying the rack 51 and its support with it, and imparting a clockwise movement to the shaft 21 through the medium of the gear 52 meshing with said rack.

Figure 3:
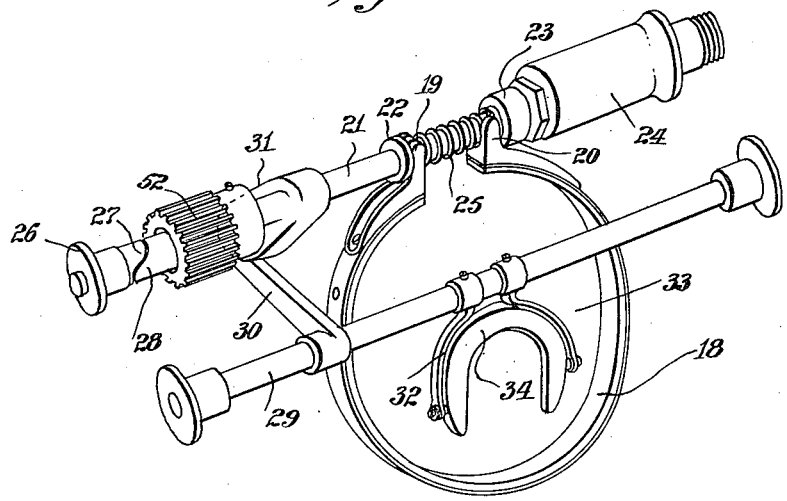
Fig. 3 is a detail view in perspective of the mechanism through which the functioning of the direct coupling connection between the driving and the driven shafts is synchronized with the mechanism controlling the set of the mechanism for low speeds.
Figure 4:
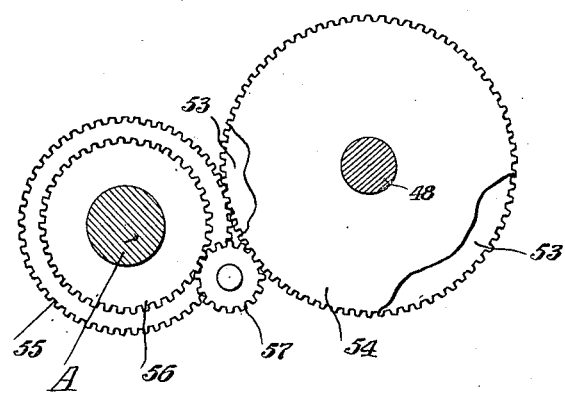
Fig. 4 is an end view illustrating the connections between the driving shaft and the controlling mechanism.

This movement of the shaft 21 will so actuate the co-operating cam surfaces 27 and 28 as to cause a longitudinal movement of said shaft 21 to the left (Fig. 3), thus permitting the spring 25 acting between the lugs 19 and 20, to release the band brake 18, and thus permit the drum 10 to turn freely with the plate 17 under the control of the planet gears carried by said plate.

At the same time the rotary movement of said shaft will cause the cam 31 to recede from the crank arm 30, and thus permit the spring 7 to force the collar 6 into engagement with the lever arms 5, and through said lever arms and the ring 4 set said friction clutch 1—2—3, so as to couple the shaft sections A and B directly together through this last named friction clutch mechanism.

When the traveler block 50 engages the collar 50ª upon the shaft 48 to the left (Fig. 1), further movement of the rack 51 is prevented, said traveler block 50 thereafter turning freely with the shaft 48, a condition which necessitates the rotatable mounting of said block in the frame and stirrup of said rack.

Upon the limit of the movement of the solenoid core 74, resulting upon the energizing of the solenoid 73, the stud 80 carried by said core will engage the arm 85 of the pivotal contact member 82, thus moving it against the tension of the spring 84 away from the fixed contact 83 so as to interrupt the circuit to said solenoid irrespective of the governor contact mechanism. In this manner the solenoid is energized only momentarily, it being merely required that the current be used for a sufficient interval to accomplish the shifting of the wheel 58.

With the above condition, the transmission is set for high speed, the sections A and B of the driving shaft and the driven shaft C having the same R. P. M., the parts remaining in the relation described, and as shown in Fig. 1 of the drawings, so long as the vehicle and the driven shaft C continue at a speed in excess of the maximum speed developed by the low speed mechanism.

If, however, the speed of the vehicle and of the driven shaft C, drop below this maximum speed of the low speed mechanism, the reduction in speed of the centrifugal governor 63 will move the contact ring 69 out of engagement with the contact 71 and cause it to engage the contact 70, thus closing the circuit to the solenoid 72, which will move the core 74 to the right (Fig. 1), carrying the clutch wheel 58 with it, thus disengaging the clutch teeth 60 thereon from the clutch teeth 62 upon the gear 54, and re-engaging the clutch teeth 59 thereon with the teeth 61 upon the gear 53. This connects the gear 53 with the shaft 48 and instantly reverses the rotation of said shaft, giving it a contra-clockwise movement with a resultant movement of the traveler block 50 to the right (Fig. 1) until it engages the collar 50$^b$ upon the shaft 48, which will arrest further movement thereof and cause said block to rotate with said shaft in the same manner as heretofore described, but in the opposite direction.

The movement of the rack 51 with the traveler block 50 will impart a contra-clockwise movement to the shaft 21 through the gear 52, causing a longitudinal movement of said shaft 21 to the right (Fig. 3) with a resultant closing of the brake band 18 upon the brake drum 10, and the instant arrest of movement of said drum. This causes the planetary gears 14—15 of each pair to become operative to reduce the speed of rotation of the shaft section B in the manner heretofore described as in starting. With the rotation of said shaft 21, the cam 31 carried thereby, will rock the shaft 29, and thus cause the yoke 34 carried thereby to move the sleeve 6 against the tension of the spring 7, and cause the release of the clutch mechanism 1—2—3, power thereafter being transmitted independently of the clutch drum 1, which, as heretofore stated, always rotates with the shaft section A. This power is applied at low speed through the housing 2 of the direct clutch mechanism connecting the sections A and B.

Upon the limit of the reciprocatory movement of the solenoid core to the right (Fig. 1), the stud 80 will engage the contact lever 76 and move it against the tension of the spring 78 away from the stud 77, thus interrupting the circuit to the low speed magnet in the same manner as the circuit to the high speed magnet was interrupted in passing from low speed to high speed.

As the stud 80 moves away from the arm 85 of the contact member 82, the spring 84 will automatically engage said contact lever with the stud 83, thus positioning this contact mechanism so that the circuit to the solenoid 73 may be closed upon the next actuation of the governor 63 at a speed to engage the ring 69 thereof with the contact 71.

It will thus be seen that the transmission mechanism will automatically go from a set for high speed, to a set for low speed, and vice versa, without any shifting of the gears utilized in the transmission of power, and that the mechanism will be so actuated by the controlling mechanism instantly when the condition of the loads requires such change.

Hence the engine itself will always operate at the highest efficiency, since it cannot be overloaded through a delay in adjusting the transmission for low speed when the working conditions are such as to require same, nor can it race when the transmission is set for low speed when the working conditions require a shifting to high speed.

The conditions attained by the use of a transmission mechanism made in accordance with my invention secure great flexibility in the engine power, and at the same time eliminate those jars and jolts which occur in changing from one speed to another, in the ordinary clash gear systems of transmission, since a change from high speed to low speed, or vice versa, in a mechanism embodying my invention occurs only when the vehicle is moving at the maximum speed for which the low speed drive is designed. For example, if the low speed drive has a maximum of ten miles an hour, the actuating mechanism for the controlling mechanism will become operative only when the vehicle is moving at ten miles per hour, either in going from high speed to low speed, or from low speed to high speed, and the increase or decrease in the rate of acceleration of the vehicle will be more or less gradual as the engine picks up the load, whether this picking up of the load results from an increase of the torque, as when running at low speed, or a decrease thereof, as when running at high speed.

The power utilized in actuating the controlling mechanism and the governor mechanism of the actuating means therefor, is so small as to be negligible. In fact the loss through friction throughout the entire transmission mechanism is practical nil, it being possible to spin the whole mechanism by hand when disconnected from the engine and the driven shaft.

An automobile under ordinary conditions, is operated with the transmission set at high speed a greater part of the time, which condition is taken into account when providing only the two speeds in the transmission mechanism of my invention. It is to be understood, however, that intermediate speeds of the driving and the driven shaft of the transmission mechanism may be secured by the ordinary engine throttle valve, although it is to be observed that the transmission mechanism will always be so set as to operate through the planetary gear system so long as the speed of the vehicle is not in excess of the maximum speed which this mechanism is capable of developing.

It must therefore follow that with the slowing down or stoppage of the vehicle, the controlling mechanism and the actuating means therefore will be instantly so actuated as to set the brake band 18 and release the clutch 1—2—3 so that upon an increase of speed, or upon the re-starting of the vehicle, power will be applied to the driven shaft C through said gear train.

If it be desired to reverse the direction of drive, the sliding clutch 36 is moved to the right (Fig. 2), out of engagement with the co-operating clutch member 35, thus disconnecting the driven shaft C from the driving shaft section B, a continued movement of said clutch member meshing the gear 41 carried thereby with the gear 42, thus causing power to be transmitted from the driving shaft to the driven shaft through the gear train 37, 38, 40, 41 and 42 and the countershaft 39.

Ordinarily when a transmission mechanism is thrown into reverse, a vehicle is at rest, or at very low speed, so that when the reverse mechanism is made operative, power will be applied to the shaft C through the low speed or planetary gearing, the same as in starting upon a direct drive. If, however, the reverse should be thrown in while the vehicle is moving at a speed in excess of the maximum speed capable of development by means of the low speed planetary gearing, nevertheless before power with the reverse drive can be applied to the shaft C, it must be brought to absolute rest, which will automatically make the low speed mechanism operative during the subsequent reverse drive.

It is to be observed in this connection that the centrifugal governor operates similarly irrespective of the direction of rotation of the shaft C.

It will also be observed that while the actuating mechanism operates only when conditions require a change in the set of the power transmission mechanism, the gears 53 and 54 rotate continuously while the engine is running, thus ensuring an instantaneous response in the controlling mechanism, to any change in the actuating means therefor.

While I have described the mechanism of my invention as being applied to an automobile, it is apparent that it is equally applicable in motorboats and in other connections where variable speed of the driven member is required.

It is not my intention to limit the invention to the details of construction shown in the accompanying drawings, it being apparent that such may be varied without departing from the spirit and scope of the invention.

Having described the invention, what I claim as new and desire to have protected by Letters Patent, is:—

1. A variable speed transmission mechanism embodying therein a driven shaft, a driving shaft embodying therein two sections, one of which is adapted to be connected with a source of power, means whereby the other of said sections may be coupled to said driven shaft, a continuously operative coupling mechanism between said shaft sections including therein means whereby said sections may be rotated at the same speed, and means whereby the section connected with said driven shaft may be rotated at a reduced speed, and a controlling mechanism including therein means operative upon said means respectively, whereby when one of them is operative to transmit power, the other is inoperative, actuating means for said last named means, and operative connections between said actuating means and the section of the driving shaft which is adapted to be connected with the source of power.

2. A variable speed transmission mechanism embodying therein a driven shaft, a driving shaft composed of two sections, one of which is adapted to be connected with a source of power, a continuously operative coupling mechanism between said driving shaft sections comprising two independently operative connecting mechanisms adapted respectively to cause one of said sections to be rotated at the same speed as, or at a lower speed than, the other of said sections, means whereby said variable speed section may be coupled to said driven shaft, and a controlling mechanism including therein means operative upon both of said connecting mechanisms, whereby when one of them is operative to transmit power, the other is inoperative, actuating means for said last named means, and operative connections between said actuating means and the section of the driving shaft which is adapted to be connected with the source of power.

3. A variable speed transmission mechanism embodying therein a driving shaft including two sections, a driven shaft, one of said sections of said driving shaft being adapted to be connected with a source of power, and the other of said sections being adapted to be connected with said driven shaft, a continuously operative coupling mechanism between said driving shaft sections comprising means whereby the sections of said driving shaft may be connected to cause them to rotate in unison, and speed reducing gearing connecting said shaft sections, whereby the section connected with said driven shaft will be rotated at a reduced speed, and a controlling mechanism including therein means operative upon said means for connecting said shaft section to rotate at the same speed, and upon said gearing, whereby when said means are operative to transmit power, said gearing will be inoperative, and when said gearing is operative, said means is inoperative, actuating means for said last named means, and operative connections between said actuating means and the section of the driving shaft which is adapted to be connected with the source of power.

4. A variable speed transmission mechanism embodying therein a driven shaft, a driving shaft embodying therein two sections, one of which is adapted to be connected with a source of power, means whereby the other of said sections may be coupled to said driven shaft, a continuously operative coupling mechanism between said shaft sections including therein means whereby said sections may be rotated at the same speed, and means whereby the section connected with said driven shaft may be rotated at a reduced speed, a controlling mechanism operative upon said means respectively, whereby when one of them is operative to transmit power, the other is inoperative, operative connections between said controlling mechanism and said driving shaft, whereby said controlling mechanism is actuated by power derived through said driving shaft, and means whereby the operative effect of said controlling mechanism upon said coupling mechanism may be controlled.

5. A variable speed transmission mechanism embodying therein a driven shaft, a driving shaft composed of two sections, one of which is adapted to be connected with a source of power, a continuously operative coupling mechanism between said driving shaft sections comprising two independently operative connecting mechanisms adapted respectively to cause one of said sections to be rotated at the same speed as, or at a lower speed than, the other of said sections, means whereby said variable speed section may be coupled to said driven shaft, a controlling mechanism operative upon both of said connecting mechanisms, whereby when one of them is operative to transmit power, the other is inoperative, operative connections between said controlling mechanism and said driving shaft, whereby said controlling mechanism is actuated by power derived through said driving shaft, and means whereby the operative effect of said controlling mechanism upon said connecting mechanisms may be controlled.

6. A variable speed transmission mechanism embodying therein a driving shaft including two sections, a driven shaft, one of said sections of said driving shaft being adapted to be connected with a source of power, and the other of said sections being adapted to be connected with said driven shaft, a continuously operative coupling mechanism between said driving shaft sections comprising means whereby the sections of said driving shaft may be connected to cause them to rotate in unison, and speed reducing gearing connecting said shaft sections, whereby the section connected with said driven shaft will be rotated at a reduced speed, a controlling mechanism operative upon said means for connecting said shaft section to rotate at the same speed, and upon said gearing, whereby when said means is operative to transmit power, said gearing is inoperative, and when said gearing is operative, said means is inoperative, operative connections between said controlling mechanism and said driving shaft, whereby said controlling mechanism is actuated by power derived through said driving shaft, and means whereby the operative effect of said controlling mechanism upon said means causing said shaft sections to rotate in unison and said speed reducing gearing, may be controlled.

7. A variable speed transmission mechanism embodying therein a driven shaft, a driving shaft embodying therein two sections, one of which is adapted to be connected with a source of power, means whereby the other of said sections may be coupled to said driven shaft, a continuously operative coupling mechanism between said shaft sections including therein means whereby said sections may be rotated at the same speed, and means whereby the section connected with said driven shaft may be rotated at a reduced speed, a controlling mechanism operative upon said means respectively, whereby when one of them is operative to transmit power, the other is inoperative, and actuating means for said controlling mechanism embodying therein automatically acting means operatively connected with said driven shaft and means operative upon said controlling mechanism to cause it to vary the operative effect of said coupling mechanism in accordance with the speed of said driven shaft.

8. A variable speed transmission mechanism embodying therein a driven shaft, a driving shaft composed of two sections, one of which is adapted to be connected with a source of power, a continuously operative coupling mechanism between said driving shaft sections comprising two independently operative connecting mechanisms adapted respectively to cause one of said sections to be rotated at the same speed as, or at a lower speed than, the other of said sections, means whereby said variable speed section may be coupled to said driven shaft, a controlling mechanism operative upon both of said connecting mechanisms, whereby when one of them is operative to transmit power, the other is inoperative, and actuating means for said controlling mechanism embodying therein automatically acting means operatively connected with said driven shaft and means operative upon said controlling mechanism to cause it to vary the operative effect of said connecting mechanisms in accordance with the speed of said driven shaft.

9. A variable speed transmission mechanism embodying therein a driving shaft including two sections, a driven shaft, one of said sections of said driving shaft being adapted to be connected with a source of power, and the other of said sections being adapted to be connected with said driven shaft, a continuously operative coupling mechanism between said driving shaft sections comprising means whereby the sections of said driving shaft may be connected to cause them to rotate in unison, and speed reducing gearing connecting said shaft sections, whereby the section connected with said driven shaft will be rotated at a reduced speed, a controlling mechanism operative upon said means for connecting said shaft section to rotate at the same speed, and upon said gearing, whereby when said means is operative to transmit power, said gearing is inoperative, and when said gearing is operative, said means is inoperative, and actuating means for said controlling mechanism embodying therein automatically acting means operatively connected with said driven shaft and means operative upon said controlling mechanism to cause it to vary the operative effect of said connecting means and said speed reducing gearing in accordance with the speed of said driven shaft.

10. A variable speed transmission mechanism embodying therein a driven shaft, a driving shaft embodying therein two sections, one of which is adapted to be connected with a source of power, means whereby the other of said sections may be coupled to said driven shaft, a continuously operative coupling mechanism between said shaft sections including therein means whereby said sections may be rotated at the same speed, and means whereby the section connected with said driven shaft may be rotated at a reduced speed, a controlling mechanism operative upon said means respectively, whereby when one of them is operative to transmit power, the other is inoperative, operative connections between said controlling mechanism and said driving shaft, whereby said controlling mechanism is actuated by power derived through said driving shaft, and actuating means for said controlling mechanism embodying therein automatically acting means operatively connected with said driven shaft and means operative upon said controlling mechanism to cause it to vary the operative effect of said coupling mechanism in accordance with the speed of said driven shaft.

11. A variable speed transmission mechanism embodying therein a driven shaft, a driving shaft composed of two sections, one of which is adapted to be connected with a source of power, a continuously operative coupling mechanism between said driving shaft sections comprising two independently operative connecting mechanisms adapted respectively to cause one of said sections to be rotated at the same speed as, or at a lower speed than, the other of said sections, means whereby said variable speed section may be coupled to said driven shaft, a controlling mechanism operative upon both of said connecting mechanisms, whereby when one of them is operative to transmit power, the other is inoperative, operative connections between said controlling mechanism and said driving shaft, whereby said controlling mechanism is actuated by power derived through said driving shaft, and actuating means for said controlling mechanism embodying therein automatically acting means operatively connected with said driven shaft and means operative upon said controlling mechanism to cause it to vary the operative effect of said connecting mechanisms in accordance with the speed of said driven shaft.

12. A variable speed transmission mechanism embodying therein a driving shaft including two sections, a driven shaft, one of said sections of said driving shaft being adapted to be connected with a source of power, and the other of said sections being adapted to be connected with said driven shaft, a continuously operative coupling mechanism between said driving shaft sections comprising means whereby the sections of said driving shaft may be connected to cause them to rotate in unison, and speed reducing gearing connecting said shaft sections, whereby the section connected with said driven shaft will be rotated at a reduced speed, a controlling mechanism operative upon said means for connecting said shaft section to rotate at the same speed, and upon said gearing, whereby when said means is operative to transmit power, said gearing is inoperative, and when said gearing is operative, said means is inoperative, operative connections between said controlling mechanism and said driving shaft, whereby said controlling mechanism is actuated by power derived through said driving shaft, and actuating means for said controlling mechanism embodying therein automatically acting means operatively connected with said driven shaft and means operative upon said controlling mechanism to cause it to vary the operative effect of said connecting means and said speed reducing gearing in accordance with the speed of said driven shaft.

13. A variable speed transmission mechanism embodying therein a driven shaft, a driving shaft including a section adapted to be connected with a source of power and a section adapted to be connected with said driven shaft, a continuously operative coupling mechanism between said driving shaft sections comprising a friction clutch adapted to connect said driving shaft sections so as to cause them to rotate in unison, and a speed reducing gearing, the gears of which are constantly in mesh, whereby power may be transmitted from one section of said driving shaft to the other, and a controlling mechanism including therein means simultaneously operative upon said friction clutch and said gearing, whereby when one of them is operative to transmit power, the other is inoperative, actuating means for said last named means, and operative connections between said actuating means and the section of the driving shaft which is adapted to be connected with the source of power.

14. A variable speed transmission mechanism embodying therein a driven shaft, a driving shaft including a section adapted to be connected with a source of power and a section adapted to be connected with said driven shaft, a friction clutch adapted to connect said driving shaft sections so as to cause them to rotate in unison, a speed reducing gearing, the gears of which are constantly in mesh, whereby power may be transmitted from one section of said driving shaft to the other, a controlling mechanism simultaneously operative upon said friction clutch and said gearing, whereby when one of them is operative to transmit power, the other is inoperative, operative connections between said controlling mechanism and said driving shaft, whereby said controlling mechanism is actuated by power derived through said driving shaft, and means whereby the operative effect of said controlling mechanism upon said clutch and said gearing may be changed to cause power to be transmitted through said friction clutch, or through said gearing.

15. A variable speed transmission mechanism embodying therein a driven shaft, a driving shaft including a section adapted to be connected with a source of power and a section adapted to be connected with said driven shaft, a friction clutch adapted to connect said driving shaft sections so as to cause them to rotate in unison, a speed reducing gearing, the gears of which are constantly in mesh, whereby power may be transmitted from one section of said driving shaft to the other, a controlling mechanism simultaneously operative upon said friction clutch and said gearing, whereby when one of them is operative to transmit power, the other is inoperative, and actuating means for said controlling mechanism embodying therein automatically acting means operatively connected with said driven shaft and means operative upon said controlling mechanism to cause it to vary the operative effect of said friction clutch and said gearing, in accordance with the speed of said driven shaft.

16. A variable speed transmission mechanism embodying therein a driven shaft, a driving shaft including a section adapted to be connected with a source of power and a section adapted to be connected with said driven shaft, a friction clutch adapted to connect said driving shaft sections so as to cause them to rotate in unison, a speed reducing gearing, the gears of which are constantly in mesh, whereby power may be transmitted from one section of said driving shaft to the other, a controlling mechanism simultaneously operative upon said friction clutch and said gearing, whereby when one of them is operative to transmit power, the other is inoperative, operative connections between said controlling mechanism and said driving shaft, whereby said controlling mechanism is actuated by power derived through said driving shaft, and actuating means for said controlling mechanism embodying therein automatically acting means operatively connected with said driven shaft and means operative upon said controlling mechanism to cause it to vary the operative effect of said friction clutch and said gearing, in accordance with the speed of said driven shaft.

17. A variable speed transmission mechanism embodying therein a driven shaft, a driving shaft including a section adapted to be connected with a source of power and a section adapted to be connected with said driven shaft, a continuously operative coupling mechanism between said driving shaft sections comprising a friction clutch, one element of which is rotatable with said first named section and another element of which is rotatable with said section adapted to be connected with said driven shaft, means whereby said elements may be made operative, or inoperative to transmit power from one of said sections to the other, a speed reducing planetary gearing adapted to transmit power from said first named section to the clutch element connected with said section connected with said driven shaft, and means whereby said gearing may be made operative or inoperative to transmit power, and a controlling mechanism including therein means acting simultaneously upon said means whereby said clutch elements are made operative or inoperative and said means whereby said gearing is made operative or inoperative, whereby when one of them is operative to transmit power, the other is inoperative, actuating means for said last named means, and operative connections between said actuating means and the section of the driving shaft which is adapted to be connected with the source of power.

18. A variable speed transmission mechanism embodying therein a driven shaft, a driving shaft including a section adapted to be connected with a source of power and a section adapted to be connected with said driven shaft, a continuously operative coupling mechanism between said driving shaft sections comprising a friction clutch, one element of which is rotatable with said first named section and another element of which is rotatable with said section adapted to be connected with said driven shaft, means whereby said elements may be made operative, or inoperative to transmit power from one of said sections to the other, a speed reducing planetary gearing comprising a sun gear carried by the clutch element rotatable with the section adapted to be connected with the driven shaft, a rotatable brake drum, a sun gear rotatable therewith, and a pair of connected planet gears carried by the shaft section connected with the source of power, and a controlling mechanism embodying therein a brake band operative upon said brake drum, means whereby said brake band may be set to develop or release braking friction upon said drum, operative connections between said last named means and the means operative to make said clutch elements operative or inoperative, whereby when said clutch is operative, said gearing is inoperative, and when said gearing is operative, said clutch is inoperative, actuating means operative upon said operative connections and said means, and operative connections between said actuating means and the section of the driving shaft which is adapted to be connected with the source of power.

19. A variable speed transmission mechanism embodying therein a driven shaft, a driving shaft including a section adapted to be connected with a source of power and a section adapted to be connected with said driven shaft, a friction clutch, one element of which is rotatable with said first named section and another element of which is rotatable with said section adapted to be connected with said driven shaft, means whereby said elements may be made operative, or inoperative to transmit power from one of said sections to the other, a speed reducing planetary gearing adapted to transmit power from said first named section to the clutch element connected with said section connected with said driven shaft, means whereby said gearing may be made operative or inoperative to transmit power, a controlling mechanism acting simultaneously upon said means whereby said clutch elements are made operative or inoperative and said means whereby said gearing is made operative or inoperative, whereby when one of them is operative to transmit power, the other is inoperative, operative connections between said controlling mechanism and said driving shaft, whereby said controlling mechanism is actuated by power derived from said driving shaft, and means determining the operative effect of said controlling mechanism.

20. A variable speed transmission mechanism embodying therein a driven shaft, a driving shaft including a section adapted to be connected with a source of power and a section adapted to be connected with said driven shaft, a friction clutch, one element of which is rotatable with said first named section and another element of which is rotatable with said section adapted to be connected with said driven shaft, means whereby said elements may be made operative, or inoperative to transmit power from one of said sections to the other, a speed reducing planetary gearing adapted to transmit power from said first named section to the clutch element connected with said section connected with said driven shaft, means whereby said gearing may be made operative or inoperative to transmit power, a controlling mechanism acting simultaneously upon said means whereby said clutch elements are made operative or inoperative and said means whereby said gearing is made operative or inoperative, whereby when one of them is operative to transmit power, the other is inoperative, and actuating means for said controlling mechanism embodying therein automatically acting means operatively connected with said driven shaft, and means operative upon said controlling mechanism to cause it to vary the operative effect of said clutch and said gearing in accordance with the speed of the driven shaft.

21. A variable speed transmission mechanism embodying therein a driven shaft, a driving shaft including a section adapted to be connected with a source of power and a section adapted to be connected with said driven shaft, a friction clutch, one element of which is rotatable with said first named section and another element of which is rotatable with said section adapted to be connected with said driven shaft, means whereby said elements may be made operative, or inoperative to transmit power from one of said sections to the other, a speed reducing planetary gearing adapted to transmit power from said first named section to the clutch element connected with said section connected with said driven shaft, means whereby said gearing may be made operative or inoperative to transmit power, a controlling mechanism acting simultaneously upon said means whereby said clutch elements are made operative or inoperative and said means whereby said gearing is made operative or inoperative, whereby when one of them is operative to transmit power, the other is inoperative, operative connections between said controlling mechanism and said driving shaft, whereby said controlling mechanism is actuated by power derived from said driving shaft, and actuating means for said controlling mechanism embodying therein automatically acting means operatively connected with said driven shaft, and means operative upon said controlling mechanism to cause it to vary the operative effect of said clutch and said gearing in accordance with the speed of the driven shaft.

22. A variable speed transmission mechanism embodying therein a driven shaft, a driving shaft including a section adapted to be connected with a source of power, and a section adapted to be connected with said driven shaft, a continuously operative coupling mechanism between said driving shaft sections comprising a friction clutch, one element of which is rotatable with said first named section, and another element of which is rotatable with said section adapted to be connected with said driven shaft, clutch setting and releasing means including a slidable collar, a spring acting thereon to normally set the clutch, a speed reducing planetary gearing comprising a sun gear carried by the clutch element rotatable with the section adapted to be connected with the driven shaft, a rotatable brake drum, a sun gear rotatable therewith, and a pair of connected planet gears carried by the shaft section connected with the source of power, and a controlling mechanism embodying therein a brake band operative upon said brake drum, a rock shaft operative upon said brake band, a spring adapted to normally release said band, a second shaft, means carried thereby operative upon said slidable collar, means whereby said rock shaft may be rocked in opposite directions, means whereby said shaft will be moved longitudinally to set or release said brake as it is rocked, connections between said rock shaft and said second shaft, whereby when said brake band is set, said gearing will be operative to transmit power, and said clutch will be released and inoperative, and when said band is released, said gearing will be inoperative to transmit power, and said clutch will be set and operative, actuating means for said rock shaft and operative connections between said actuating means and the section of the driving shaft which is adapted to be connected with the source of power.

23. A variable speed transmission mechanism embodying therein a driven shaft, a driving shaft embodying therein two sections, one of which is adapted to be connected with a source of power, means whereby the other of said sections may be coupled to said driven shaft, a coupling mechanism between said shaft sections including therein means whereby said sections may be rotated at the same speed, and means whereby the section connected with said driven shaft may be rotated at a reduced speed, a controlling mechanism operative upon said means respectively, whereby when one of them is operative to transmit power, the other is inoperative, and actuating means for said controlling mechansm embodying a centrifugal governor, operatively connected with said driven shaft, two electro-magnets, two electrical contacts included in the circuit to said magnets respectively, an electrical contact operatively connected with said governor and adapted to engage either of said first named contacts as determined by the speed of said driven shaft, and means controlled by said magnets and operative upon said controlling mechanism to cause it to vary the operative effect of said coupling mechanism in accordance with the speed of said driven shaft.

24. A variable speed transmission mechanism embodying therein a driven shaft, a driving shaft embodying therein two sections, one of which is adapted to be connected with a source of power, means whereby the other of said sections may be coupled to said driven shaft, a coupling mechanism between said shaft sections including therein means whereby said sections may be rotated at the same speed, and means whereby the section connected with said driven shaft may be rotated at a reduced speed, a controlling mechanism operative upon said means respectively, whereby when one of them is operative to transmit power, the other is inoperative, and actuating means for said controlling mechanism embodying a centrifugal governor, operatively connected with said driven shaft, two electro-magnets, two electrical contacts included in the circuit to said magnets respectively, an electrical contact operatively connected with said governor and adapted to engage either of said first named contacts as determined by the speed of said driven shaft, means controlled by said magnets and operative upon said controlling mechanism to cause it to vary the operative effect of said coupling mechanism in accordance with the speed of said driven shaft, and a circuit interrupter arranged in the circuit to each of said magnets and adapted to be actuated by said last named means, whereby the circuit to one magnet will be opened, and the circuit to the other magnet will be closed, after each actuation of said means.

25. A variable speed transmission mechanism embodying therein a driven shaft, a driving shaft embodying therein two sections, one of which is adapted to be connected with a source of power, means whereby the other of said sections may be coupled to said driven shaft, a coupling mechanism between said shaft sections including therein means whereby said sections may be rotated at the same speed, and means whereby the section connected with said driven shaft may be rotated at a reduced speed, a controlling mechanism comprising a screw shaft, a traveler block mounted thereon, two gears carried by said driving shaft, two clutch gears idly mounted upon said screw shaft, an idler gear in mesh with one of said gears upon said driving shaft and one of said clutch gears, the other of said clutch gears meshing directly with a gear upon said driving shaft, whereby said clutch gears will be rotated in opposite directions, a clutch wheel carried by and rotatable with said screw shaft, and operative connections between said traveler block and said means respectively, whereby when one of them is operative to transmit power, the other is inoperative, and means whereby said clutch wheel is caused to engage one or the other of said clutch gears.

26. A variable speed transmission mechanism embodying therein a driven shaft, a driving shaft embodying therein two sections, one of which is adapted to be connected with a source of power, means whereby the other of said sections may be coupled to said driven shaft, a coupling mechanism between said shaft sections including therein means whereby said sections may be rotated at the same speed, and means whereby the section connected with said driven shaft may be rotated at a reduced speed, a controlling mechanism comprising a screw shaft, a traveler block mounted thereon, two gears carried by said driving shaft, two clutch gears idly mounted upon said screw shaft, an idler gear in mesh with one of said gears upon said driving shaft and one of said clutch gears, the other of said clutch gears meshing directly with a gear upon said driving shaft, whereby said clutch gears will be rotated in opposite directions, a clutch wheel carried by and rotatable with said screw shaft, and operative connections between said traveler block and said means respectively, whereby when one of them is operative to transmit power, the other is inoperative, and actuating means for said controlling mechanism embodying therein automatically acting means operatively connected with said driven shaft and means actuated thereby and operative upon said clutch wheel to cause said traveler block to be actuated to vary the operative effect of said coupling mechanism in accordance with the speed of said driven shaft.

27. A variable speed transmission mechanism embodying therein a driven shaft, a driving shaft embodying therein two sections, one of which is adapted to be connected with a source of power, means whereby the other of said sections may be coupled to said driven shaft, a continuously operative coupling mechanism between said shaft sections including therein means whereby said sections may be rotated at the same speed, and means whereby the section connected with said driven shaft may be rotated at a reduced speed, a controlling mechanism including therein means operative upon said means respectively, whereby when one of them is operative to transmit power, the other is inoperative, actuating means for said last named means, and operative connections between said actuating means and the section of the driving shaft which is adapted to be connected with the source of power, a gear upon said shaft section adapted to be connected with said driven shaft, a slidable gear carried by said driven shaft, reversing intermediate gearing, and means whereby said slidable gear may be engaged with, or disengaged from, said intermediate gearing.

28. A variable speed transmission mechanism embodying therein a driven shaft, a driving shaft embodying therein two sections, one of which is adapted to be connected with a source of power, means whereby the other of said sections may be coupled to said driven shaft, a coupling mechanism between said shaft sections including therein means whereby said sections may be rotated at the same speed, and means whereby the section connected with said driven shaft may be rotated at a reduced speed, a controlling mechanism operative upon said means respectively, whereby when one of them is operative to transmit power, the other is inoperative, a gear upon said shaft section adapted to be connected with said driven shaft, a slidable gear carried by said driven shaft, reversing intermediate gearing, means whereby said slidable gear may be engaged with, or disengaged from, said intermediate gearing, and actuating means for said controlling mechanism embodying therein automatically acting means operatively connected with said driven shaft and means operative upon said controlling mechanism to cause it to vary the operative effect of said coupling mechanism in accordance with the speed of said driven shaft.

29. A variable speed transmission mechanism embodying therein a driven shaft, a driving shaft embodying therein two sections, one of which is adapted to be connected with a source of power, a clutch member carried by the other driving section, a co-operating clutch member slidably mounted upon, and rotatable with, said driven shaft, whereby the other of said sections may be coupled to said driven shaft, a coupling mechanism between said shaft sections including therein means whereby said sections may be rotated at the same speed, and means whereby the section connected with said driven shaft may be rotated at a reduced speed, a controlling mechanism operative upon said means respectively, whereby when one of them is operative to transmit power, the other is inoperative, a gear upon said shaft section adjacent said first named clutch member, a gear upon said co-operating clutch member, reversing intermediate gears, one of which is adapted to constantly mesh with said first named gear, and means whereby said co-operating clutch member may be disengaged from said first named clutch member to prevent actuation of, or engaged therewith to cause a direct drive to said driven shaft, or the gear thereon may be meshed with said intermediate gearing to cause a reverse drive of said driven shaft.

30. A variable speed transmission mechanism embodying therein a driven shaft, a driving shaft embodying therein two sections, one of which is adapted to be connected with a source of power, a clutch member carried by the other driving section, a co-operating clutch member slidably mounted upon, and rotatable with, said driven shaft, whereby the other of said sections may be coupled to said driven shaft, a coupling mechanism between said shaft sections including therein means whereby said sections may be rotated at the same speed, and means whereby the section connected with said driven shaft may be rotated at a reduced speed, a controlling mechanism operative upon said means respectively, whereby when one of them is operative to transmit power, the other is inoperative, a gear upon said shaft section adjacent said first named clutch member, a gear upon said co-operating clutch member, reversing intermediate gears, one of which is adapted to constantly mesh with said first named gear, means whereby said co-operating clutch member may be disengaged from said first named clutch member to prevent actuation of, or engaged therewith to cause a direct drive to said driven shaft, or the gear thereon may be meshed with said intermediate gearing to cause a reverse drive of said driven shaft, and actuating means for said controlling mechanism embodying therein automatically acting means operatively connected with said driven shaft and means operative upon said controlling mechanism to cause it to vary the operative effect of said coupling mechanism in accordance with the speed of said driven shaft.

In witness whereof I have hereunto affixed my signature, in the presence of two subscribing witnesses, this 21st day of June, 1920.

JOHN HASSELBRING, Jr.

Witnesses:
JOHN HASSELBRING,
F. T. WENTWORTH.